United States Patent
Shah et al.

(10) Patent No.: US 6,268,673 B1
(45) Date of Patent: Jul. 31, 2001

(54) CONTROL COIL ARRANGEMENT FOR A ROTATING MACHINE ROTOR

(75) Inventors: Manoj R. Shah, Latham; Chad R. Lewandowski, Amsterdam, both of NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/305,376

(22) Filed: May 5, 1999

(51) Int. Cl.[7] .............. H02K 7/09; H02K 21/00; H02K 11/00; H02K 1/12; H02K 1/22

(52) U.S. Cl. .......... 310/90.5; 310/181; 310/261; 310/254; 310/68 B

(58) Field of Search .................. 310/90.5, 181, 310/216, 261, 166, 157, 82, 254, 263, 90, 68 B, 67 R

(56) References Cited

U.S. PATENT DOCUMENTS

| | | | |
|---|---|---|---|
| 4,057,369 | * 11/1977 | Isenberg et al. | 417/365 |
| 5,250,865 | * 10/1993 | Meeks | 310/90.5 |
| 5,315,197 | * 5/1994 | Meeks et al. | 310/90.5 |
| 5,705,869 | * 1/1998 | Kliman et al. | 310/90.5 |
| 5,734,213 | * 3/1998 | Oh | 310/67 R |
| 5,818,137 | * 10/1998 | Nichols et al. | 310/90.5 |

* cited by examiner

Primary Examiner—Nestor Ramirez
Assistant Examiner—Guillermo Perez
(74) Attorney, Agent, or Firm—John T. Lucas; Virginia B. Caress; Paul A. Gottlieb

(57) ABSTRACT

A rotating machine (e.g., a turbine, motor or generator) is provided wherein a fixed solenoid or other coil configuration is disposed adjacent to one or both ends of the active portion of the machine rotor for producing an axially directed flux in the active portion so as to provide planar axial control at single or multiple locations for rotor balance, levitation, centering, torque and thrust action. Permanent magnets can be used to produce an axial bias magnetic field. The rotor can include magnetic disks disposed in opposed, facing relation to the coil configuration.

11 Claims, 7 Drawing Sheets

CONTROL COIL ARRANGEMENT FOR A ROTATING MACHINE ROTOR

FIELD OF THE INVENTION

The present invention relates to rotating machines, e.g., turbines, motors and generators, and, more particularly, to a control coil arrangement for providing rotor balance, levitation, centering, torque, and thrust control in such machines.

BACKGROUND OF THE INVENTION

Magnetic thrust bearings providing axial thrust have recently been developed to replace mechanical thrust bearings used in all types of rotating machines, e.g., turbines, motors and generators, having a rotor and a stator. These magnetic thrust bearings serve to enhance dynamic performance, reduce power loss and possibly reduce the overall length of the associated rotating machine. A typical mechanical thrust bearing and its collar are shown in FIG. 1A which is a schematic cross sectional view of a rotating machine. In FIG. 1A, a conventional stator 10 and a rotor 12 are separated by an air gap 14. As illustrated, rotor 12 includes a projecting thrust collar 16 which rotates with rotor 12 between a fixed thrust stop 18. A typical magnetic thrust bearing is shown in FIG. 1B. As illustrated, the fixed thrust stop of the mechanical thrust bearing of FIG. 1A is replaced by a C-core solenoid coil 19 or by a variation thereof. It will be appreciated that the thrust bearing may be of smaller diameter than the machine rotor diameter and, therefore, may have limited axial force capability. Further, the overall design of the machine may place limits on the axial spacing assigned for the bearing function, thereby additionally restricting overall control.

SUMMARY OF THE INVENTION

Generally speaking, in accordance with the invention, there are provided solenoid and other coil configurations (with or without associated permanent magnets for producing an axial bias magnetic field) which are disposed at one or both axial ends of a rotating machine rotor (with or without magnetic disks), independent of the machine orientation or axis of rotation, and which afford planar axial control at single or multiple locations for rotor balance and thrust action.

According to the invention, a rotating machine is provided which comprises: a stator; a rotor adapted for rotation relative to the stator and including an active portion; and at least one fixed coil disposed adjacent to at least one end of the active portion of the rotor for producing an axially directed flux in the active portion so as to provide rotor balance, levitation, centering, torque, and thrust control.

In one preferred embodiment, the active portion includes a magnetic disk at the at least one end thereof.

In an advantageous implementation, the fixed coil comprises a C-core or E-core solenoid coil supported by a stationary member.

In an alternative advantageous implementation, the fixed coil comprises a control coil wound on a stationary member. Preferably, the stationary member comprises a plurality of axially extending elements and a separate control coil is wound on each of the elements. In an important embodiment, a permanent magnet is disposed adjacent to the fixed coil for producing a bias flux. In one preferred embodiment, a permanent magnet is secured to an end face of each of the elements. The permanent magnets advantageously comprise arcuate segments of a segmented permanent magnet of a discontinuous annular shape.

In an alternative implementation, the permanent magnet comprises a permanent magnetic disk supported on the active portion of said rotor in spaced, opposed relation with respect to the coils.

In another implementation of the embodiment discussed above, the at least one coil preferably comprises first and second coils mounted on the stationary member in radially spaced relation. The permanent magnet is preferably mounted on the stationary member in a radial plane extending between the first and second coils. Advantageously, the stationary member comprises first and second sets of axially projecting portions, the first set forming a first discontinuous annulus of a first diameter and the first coil comprising a first plurality of windings individually wound on respective projecting portions of the first set, and the second set forming a second discontinuous annulus having a diameter smaller than the diameter of the first annulus and being nested within the first annulus, and the second coil comprising a second plurality of windings individually wound on the projecting portions of the second set. Preferably, the axially projecting portions of the first and second sets each include a radially projecting arcuate base portion at an end thereof remote from the rotor and the permanent magnet includes a plurality of arcuate segments forming a discontinuous annulus, each of the arcuate segments being supported between respective pairs of opposed arcuate base portions of the axially projecting portions of the first and second sets.

A non-magnetic barrier is advantageously disposed at the at least one end for supporting the magnetic disk on the rotor.

In an advantageous embodiment, the machine includes a fixed coil disposed adjacent to each end of the active portion thereof, i.e., at both ends of the rotor. Preferably, this active portion also includes a magnetic disk at both ends thereof. Advantageously, a permanent magnet is disposed adjacent to each of the coils for producing a bias flux. In one implementation, the permanent magnet (PM) comprises a permanent magnet disk supported with each of the coils on a stationary member. In an alternative implementation, the permanent magnet comprises a permanent magnet disk supported on the active portion of the rotor in spaced, opposed relation with respect to each of the coils.

Other features and advantages of the invention will be set forth in, or apparent from, the following detailed description of preferred embodiments of the invention.

DESCRIPTION OF THE PREFERRED EMBODIMENTS

Figure 1A:
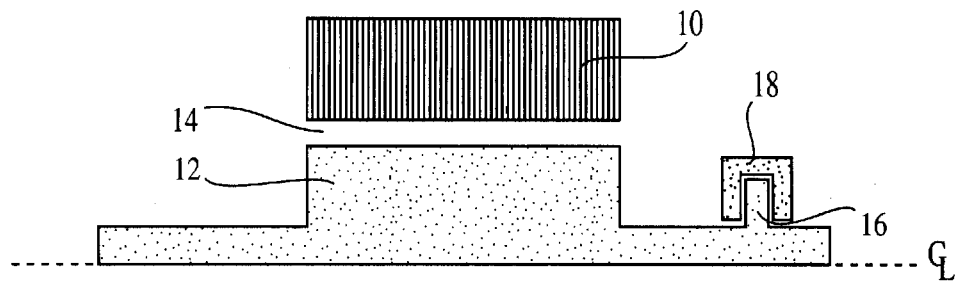
FIG. 1A is, as described above, a schematic representation, broken away at the axial center line, of a rotating machine incorporating a prior art mechanical thrust bearing arrangement.
Figure 1B:
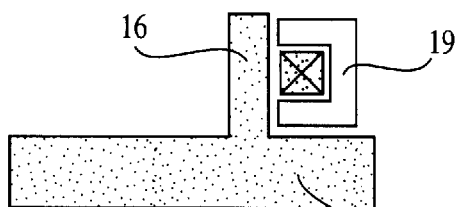
FIG. 1B is, as described above, a schematic representation of a portion of the machine of FIG. 1 A, but incorporating a prior art magnetic thrust bearing.
Figure 2:
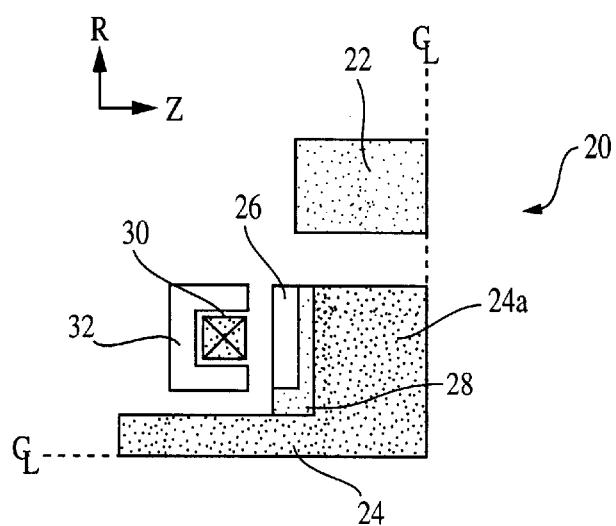
FIG. 2 is a schematic representation, broken away at both the axial center line and a transverse center line, of a control coil arrangement in accordance with a first embodiment of the invention.
Figure 3A:
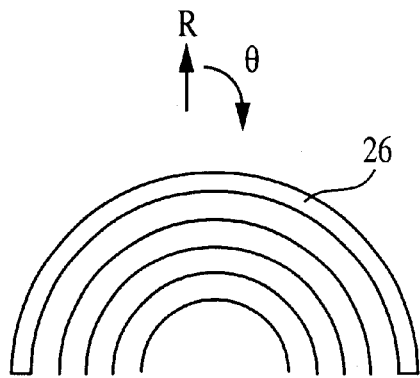
FIG. 3A is an end elevational view of a first preferred embodiment of the magnetic disk of FIG. 2.
Figure 3B:
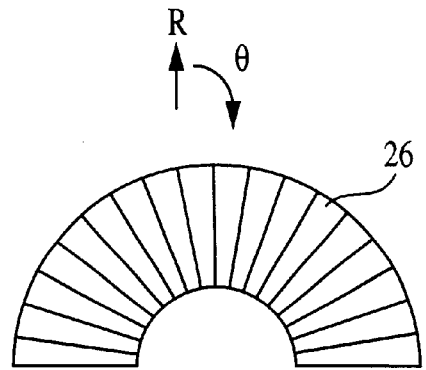
FIG. 3B is an end elevational view of a second preferred embodiment of the magnetic disk of FIG. 2.

Referring to FIG. 2, a first embodiment of the invention is shown. A rotating machine 20 includes a stator 22 and a rotor 24. A magnetic disk 26, a front view of two different embodiments of which are shown in FIGS. 3A and 3B, respectfully, is mounted on a planar, radially extending face of the active portion 24a of rotor 24 by means of a non-magnetic barrier and support element 28, if such a barrier is necessary. In FIG. 3A, magnetic disk 26 is formed by radially spaced, circumferentially extending elements while in FIG. 3B disk 26 is formed by circumferentially spaced, radially extending elements, as illustrated. As illustrated, disk 26 extends circumferentially around the axis of rotor 24 and lies in a plane parallel to a radial face of rotor 24. A fixed solenoid coil 30 and associated C-core 32 are mounted adjacent to the rotor such that solenoid 30 is disposed opposite, i.e., in facing relation to, magnetic disk 26. In general, solenoid 30 is disposed around the rotor spindle next to the corresponding rotor end face such that the solenoid 30 provides the required controlled force distribution with minimum adverse impact on other control and power functions of the machine. Solenoid can be supported from the stator 22 or can be separately supported.

Figure 4:
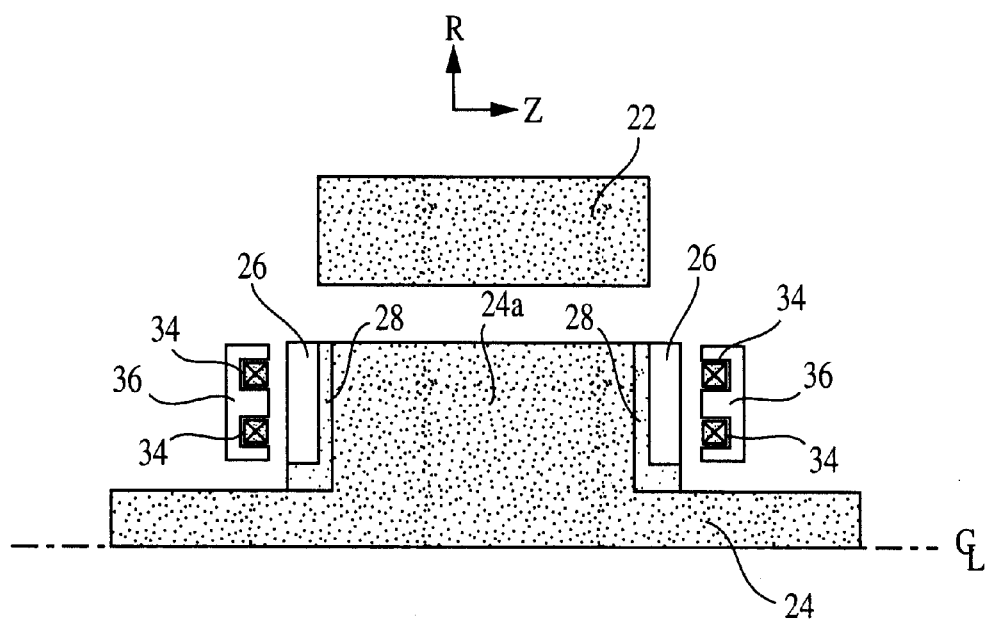
FIG. 4 is a schematic representation, similar to that of FIG. 2, of a further preferred embodiment of the invention.

Referring to FIG. 4, a similar embodiment is shown wherein corresponding elements have been given the same reference numerals. In FIG. 4, the C-core solenoid of FIG. 2 is replaced by an E-core solenoid arrangement comprising a solenoid 34 and associated E-core 36. More importantly, in this embodiment, solenoids 34 are placed opposite both radial planar faces of the active portion 24a of rotor 24 so as to provide planar control at two radial locations rather than the planar control at one radial location of FIG. 2. It will, of course, be understood that the type of solenoid used has nothing to do with whether planar controlled operation is used at multiple locations and that the C-core solenoid 30 of FIG. 2 can be used in a solenoid arrangement to control multiple locations such as shown in FIG. 4. It is noted that placing the axial controls (e.g., the solenoid control coils 30 or 34) at two locations, as provided in FIG. 4, increases the system flexibility by doubling the number of degrees of freedom for more effective control action at potentially minimum costs, thereby resulting in improved performance, Further, generating the axial forces at the full rotor diameter as shown for the embodiments of FIGS. 2 and 4 may permit a reduction in the axial space requirements as compared with a conventional thrust bearing, whether magnetic or mechanical, while providing increased functionality. The provision of a magnetic disk 26, as shown, reduces reluctivity in the peripheral direction so as to direct flux between poles. It will also be appreciated that while the illustrated configurations are advantageous, other configurations can also be used.

Figure 5:
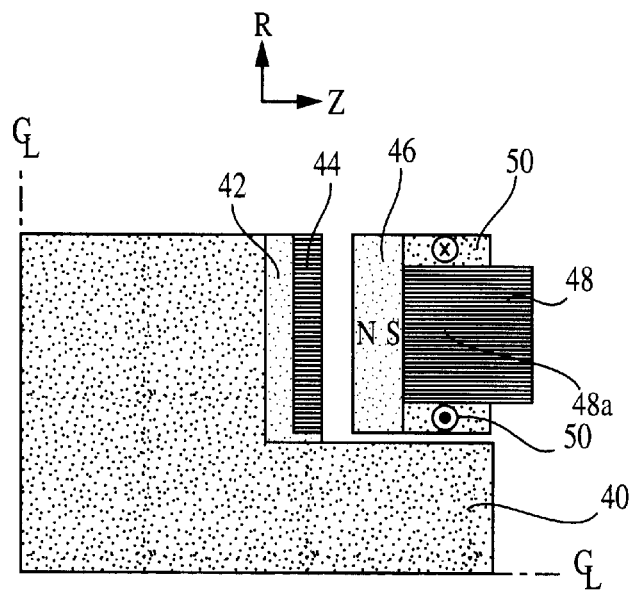
FIG. 5 is a schematic representation similar to that of FIG. 2, of another preferred embodiment of the invention.
Figure 6:
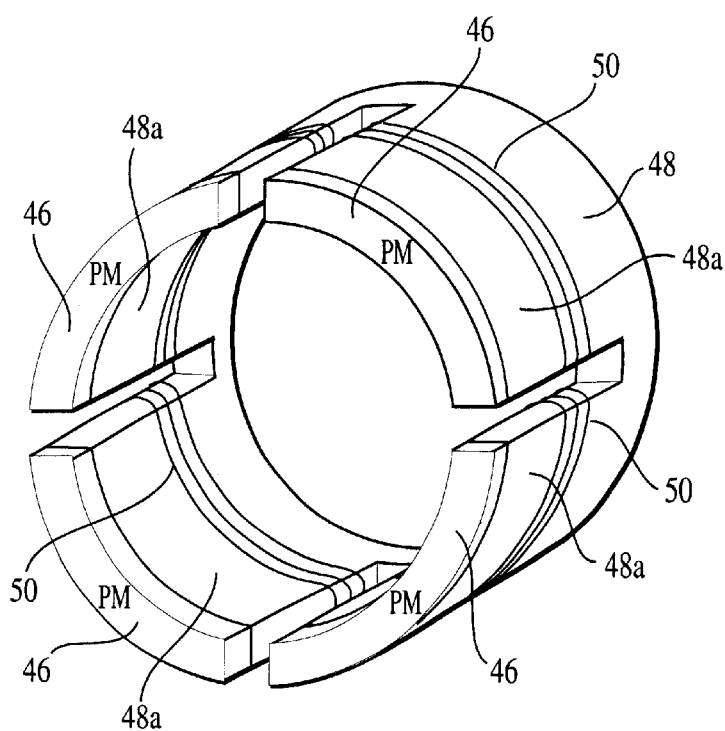
FIG. 6 is a perspective view of the stationary member of the embodiment of FIG. 5.
Figure 7:
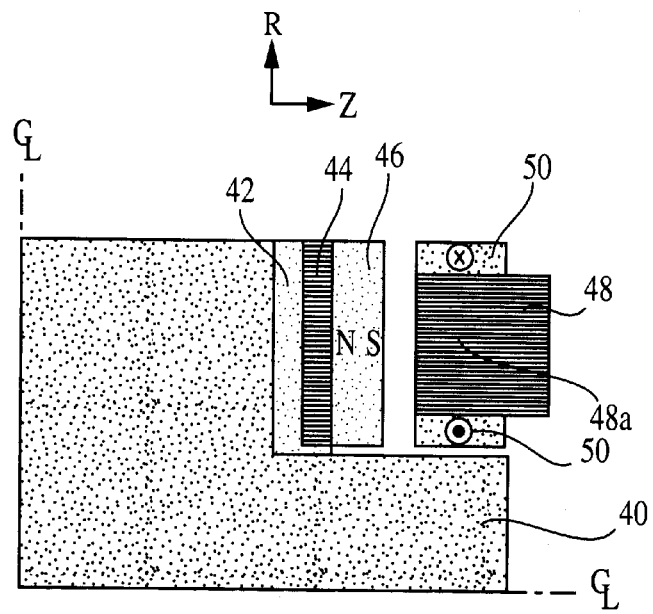
FIG. 7 is a schematic representation, similar to that of FIG. 5, of yet a further preferred embodiment of the invention.
Figure 8:
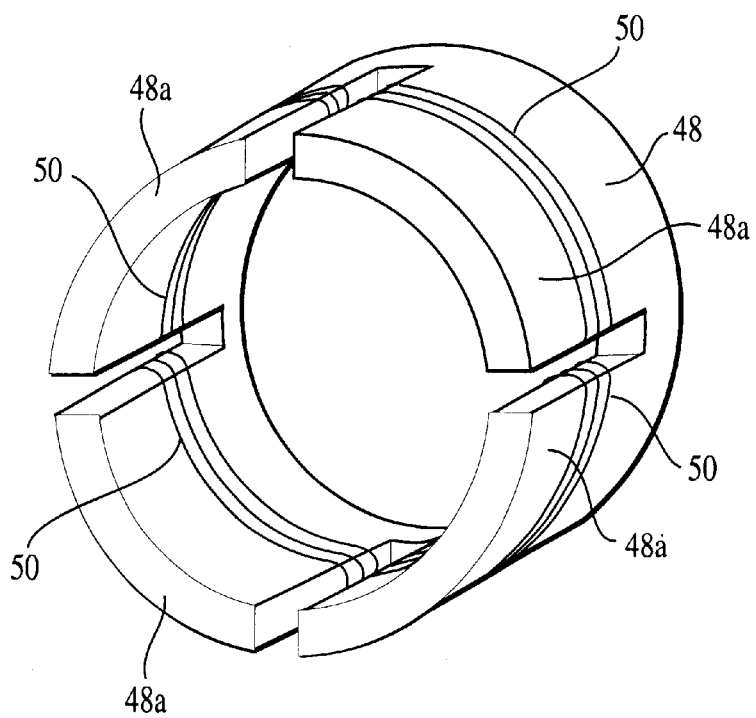
FIG. 8 is a perspective view of the stationary member of the embodiment of FIG. 7.

Referring to FIGS. 5 and 6, and to FIGS. 7 and 8, two different embodiments are illustrated wherein control coils are used in combination with permanent magnets. It will be understood that while the machines of each of the illustrated embodiments have a four pole configuration, any even number of control coils and permanent magnets can be used. Referring to FIGS. 5 and 6, the illustrated machine includes a rotor 40 having a radial face against which a non-magnetic barrier 42 is disposed, if required, for supporting a magnetic disk 44. Arranged in opposed, facing relation is a segmented permanent magnet disk 46 which, as shown in FIG. 6, is divided into four arcuate segments for the four pole machine. As is illustrated in FIG. 6, the segments of disk 46 are mounted on respective end faces of corresponding projecting portions 48a of a stationary core member 48. Control coils 50 are wound on these projecting portions 48a of core member 48, as shown.

The embodiment of FIGS. 7 and 8 is similar to that of FIGS. 5 and 6 and corresponding elements have been given the same reference numerals. The only difference is that in the embodiment of FIGS. 7 and 8, the permanent magnet 46 is located on the rotor 40 rather than stationary member 48. Both of the embodiments enable the permanent magnets 46 to provide a bias flux, while the control coils 50 provide the control flux and/or additional bias flux. The flux paths in these embodiments are identical for the control coils 50 and the permanent magnets 46.

It is noted that each control winding 50 and permanent magnet 46 is shown to be located in the same peripheral space but this is not always necessary for creating the desired time and space force distribution. The various control coils or windings 50 can physically differ from the other coils in terms of the number of poles, number of turns, number of phases, mechanical displacement, full or partial peripheral occupancy, functionality and the like. The embodiment of FIGS. 7 and 8 is an application of an axial flux motor for axial and peripheral control.

Figure 9:
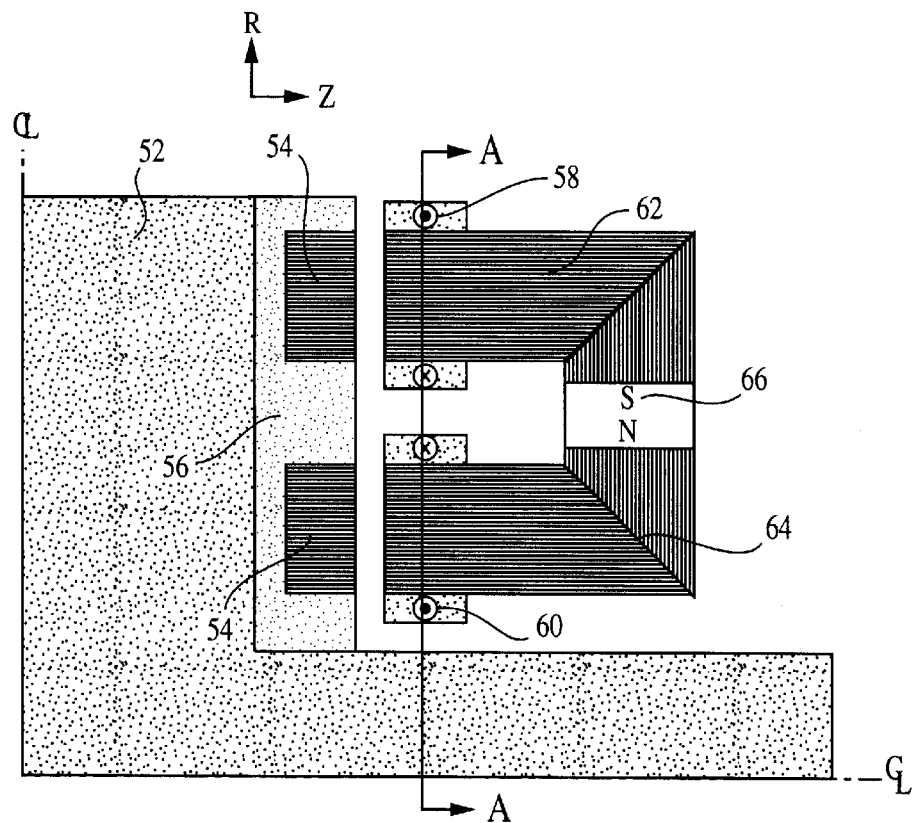
FIG. 9 is a schematic representation, similar to that of FIGS. 5 and 7, of still another preferred embodiment of the invention.
Figure 10:
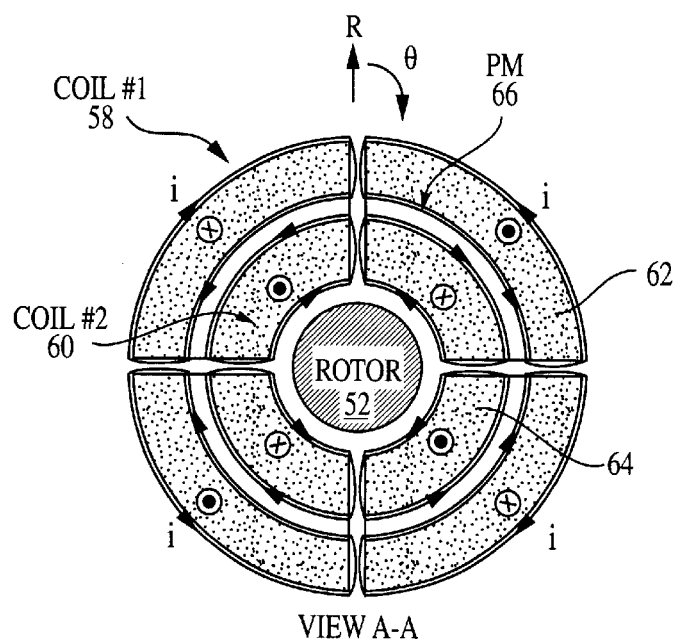
FIG. 10 is a schematic end view of the coil and PM of FIG. 9 showing the current and magnetic field paths.
Figure 11:
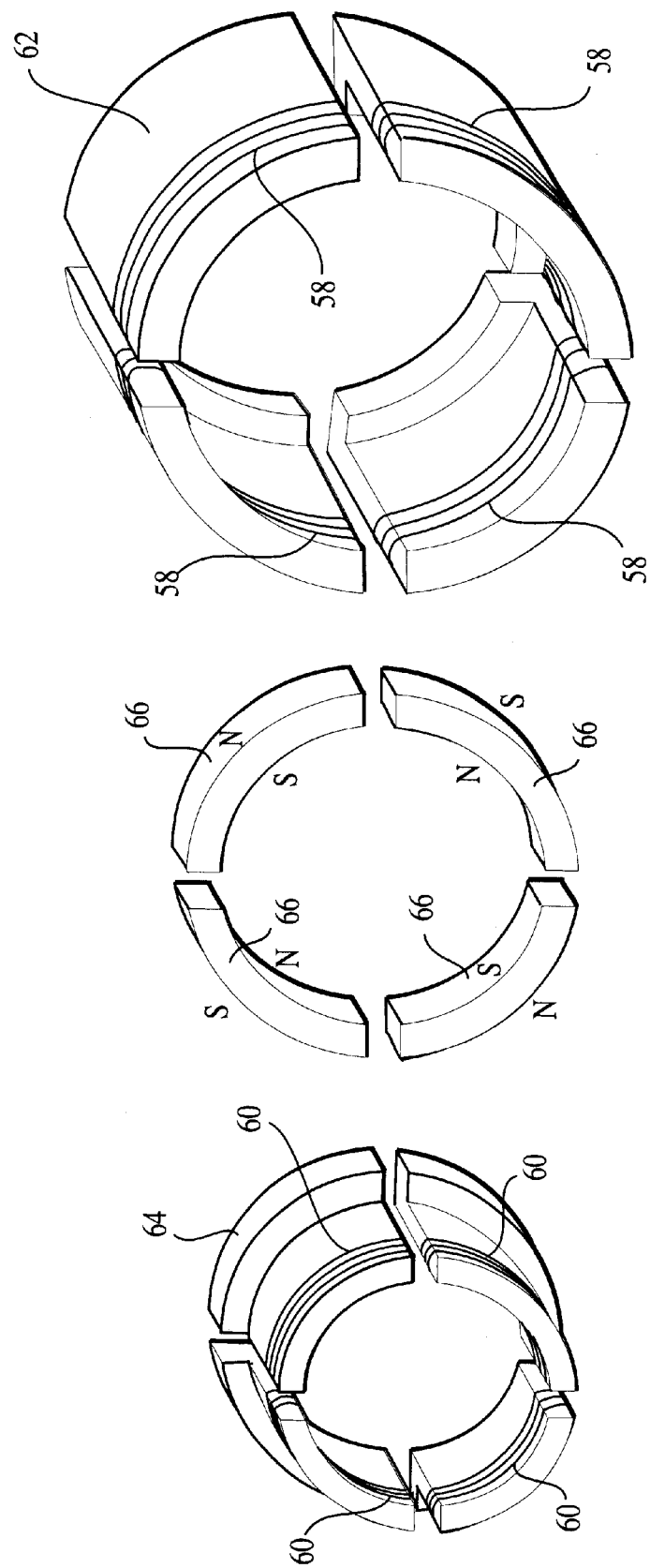
FIG. 11 is an exploded perspective view of the stationary member of the embodiment of FIGS. 9 and 10.

Referring to FIGS. 9 to 11, schematic representations are provided of heteropolar axial thrust and torque control constructions with permanent magnet (solid or multilayered) bias. The goal of this embodiment is to prevent the control coil flux from passing through the permanent magnets, as is accomplished in radial homopolar magnetic bearings. In FIG. 9, a rotor 52 is shown which has a pair of annular magnetic disks 54 supported in an E-shaped support member 56 mounted on a radial planar face thereof. Separate coils 58 and 60, which oppose respective disks 54, are wound on respective core members 62 and 64 as is perhaps best seen in the disassembled state or exploded view shown in FIG. 11. A segmented, annular permanent magnet 66 (see FIG. 11) is located between respective base portions of cores 62 and 64 as shown in FIG. 9.

Figure 13:
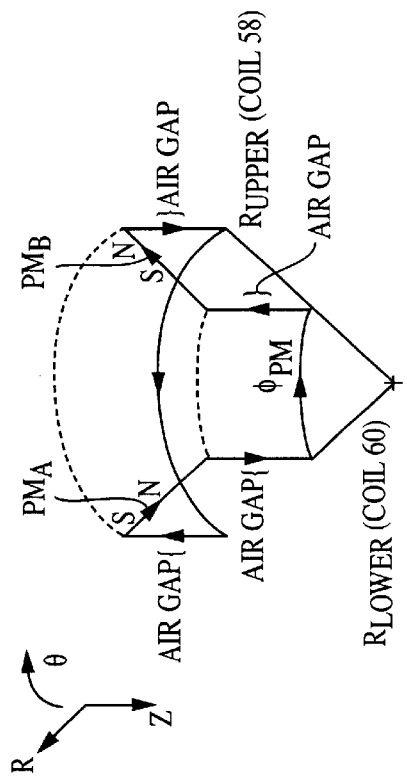
FIG. 13 is a spacial diagram of the permanent magnet bias flux path of FIG. 12.
Figure 12:
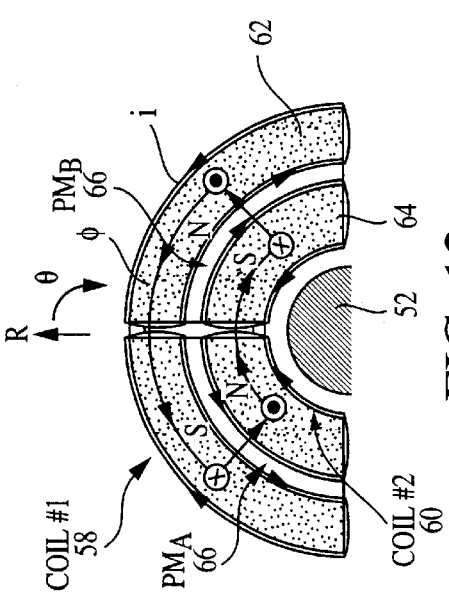
FIG. 12 is an end elevation view similar to that of FIG. 10 showing permanent magnet bias flux path.

The flux from permanent magnet 66, shown in FIG. 12 and, in more detail, in FIG. 13, must be viewed as a permanent magnet pair in which flux travels between the permanent magnets. Referring to FIGS. 12 and 13, the permanent magnet bias flux ($\phi$) shown in FIG. 13, beginning at the left side of the $R_{LOWER}$ region, travels axially from one segment of permanent magnet 66 along the lower radial region ($R_{LOWER}$ in FIG. 13), leaves the pole of coil 60, passes through the air gap and then proceeds peripherally within the magnetic disk 54 mounted on the rotor next to the permanent magnet segment 66 (at the right side of FIG. 13). At this permanent magnet segment 66, the flux reenters the gap in the $R_{LOWER}$ region and proceeds through the pole of coil 60 associated with the other permanent magnet pair since its polarity is reversed. The flux then travels radially through the permanent magnet segment 66 and turns back axially through the pole of coil 58 and reenters the air gap with the flux now located in the upper radial region, $R_{UPPER}$ (FIG. 13). The flux then returns peripherally within the corresponding magnetic disk 54 on the rotor toward the original permanent magnet segment 66 and proceeds through the air gap in the $R_{UPPER}$ region at the associated pole of coil 58, thereby completing the flux path.

Figure 15:
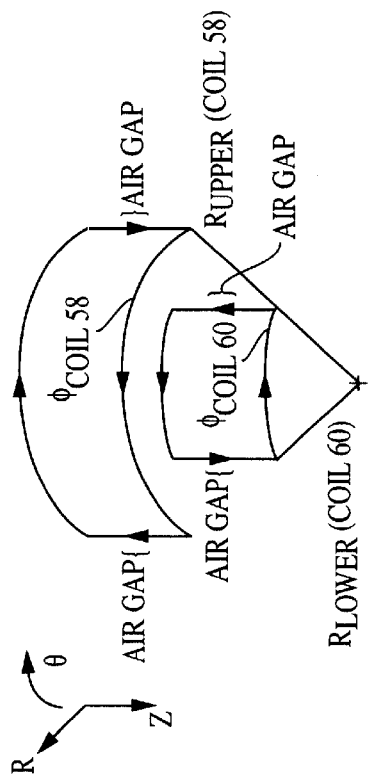
FIG. 15 is a spacial diagram of the control coil flux path of FIG. 14.
Figure 14:
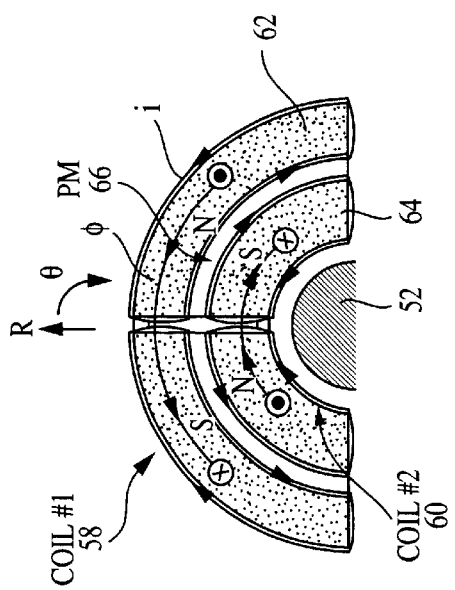
FIG. 14 is an end elevation view similar to that of FIG. 12 showing the control coil flux path.

Referring to FIGS. 14 and 15, the control coil flux ($\phi$) path shares the same air gap, magnetic disk on the rotor and axial portions of the stationary core as the permanent magnet flux just described. However, the control coil flux does not travel radially but, instead, the $R_{LOWER}$ region control flux (FIG. 15) leaves the pole of coil 60 and travels axially through the air gap. The flux then proceeds peripherally within the magnetic disk to the other adjacent control coil pair, re-enters the air gap and passes through the other pole of coil 60 at the $R_{LOWER}$ region. Next the flux travels peripherally through the back iron of the stationary member to the initial control coil instead of passing through the permanent magnet. This completes the control coil flux path, as shown in FIG. 15, and ensures that the control path does not pass through the permanent magnet, thereby minimizing the adverse impact on the characteristics of the permanent magnet due to overheating, for example. The control coil flux located in the $R_{UPPER}$ region proceeds identically as the $R_{LOWER}$ flux except the flux passes through coil 58.

It is noted that the coil and magnet centers may not be the same as that of the rotor and, if necessary, these centers could be placed with a tilt angle so as to develop a peripheral variation of the axial forces. This can be further extended by using coils that produce a travel force wave in axial and peripheral directions similarly to an axial flux machine. For rotating machines, and particularly those with permanent magnet rotors, a magnetic disk can be installed at one or both axial ends of the rotor, as described above, so as to increase the axially directed flux, thereby reducing control power requirements. These magnetic disks can be formed by laminations, tapes, powdered core or solid magnetic steel and the like.

It will be appreciated that by moving the thrust bearing function next to the main rotor, machining of the rotor shaft can be simplified and costs reduced because of the elimination of the thrust collar. The magnetic disk used can be constructed so as to minimize field leakage, aid in rotor balancing and enhance the mechanical integrity of the rotor. The use of electromechanical contactless thrust bearings for vertical, horizontal and inclined machines reduces losses and minimizes wear, thereby increasing the reliability and life of the machine.

While the focus herein above has been on axial control and thrust related issues, it should be understood that the invention can be used in combination with other techniques to provide a fully global, tri-axial ($\theta$-peripheral, R-radial and Z-axial) control for overall rotor balance and to generate controlled forces for levitation, centering, torque and thrust.

Although the present invention has been described relative to specific exemplary embodiments thereof, it will be understood by those skilled in the art that variations and modifications can be effected in these exemplary embodiments without departing from the scope and spirit of the invention.

Key to drawings 20 Rotating machine 22 Stator 24 Rotor 24a Active portion 26 Magnetic disk 28 Non-magnetic barrier and support element 30 Fixed solenoid coil 32 C-core 34 Solenoid 36 E-core 40 Rotor 42 Non-magnetic barrier 44 Magnetic disk 46 Segmented permanent magnet disk 48 Stationary core member 48a Projecting portions (poles) 50 Control coils 52 Rotor 54 Annular magnetic disk 56 E-shaped support member 58/60 Separate coils 62/64 Core members 66 Permanent magnet

What is claimed:

1. A rotating machine comprising:

a stator;

a rotor adapted for rotation relative to the stator and including an active portion;

a thrust bearing comprising first and second coils mounted on a stationery member and disposed adjacent to at least one end of the active portion of the rotor for producing an axially directed flux in said active portion so as to provide rotor balance, levitation, centering, torque and thrust control, and wherein the stationery member comprises first and second sets of axially projecting portions, said first set forming a first discontinuous annulus of a first diameter and said first coil comprising a first plurality of windings individually wound on respective protecting portions of the first set, and said second set forming a second discontinuous annulus with a second diameter being nested within said first annulus, and said second coil comprising a second plurality of windings individually wound on the projecting portions of said second set; and a permanent magnet supported with said coils on the stationery member.

2. A machine as claimed in claim 1, wherein said coils comprise at least one C-core solenoid coil supported by said stationery member.

3. A machine as claimed in claim 1, wherein said coils comprise at least one E-core solenoid coil supported by said stationery member.

4. A machine as claimed in claim 3, wherein said at least one E-core solenoid coil comprises coils carrying opposite currents.

5. A machine as claimed in claim 1, wherein said thrust bearing is applied directly to said active portion of said rotor.

6. A machine as claimed in claim 1, wherein said permanent magnet comprises a permanent magnetic disk supported on said active portion of said rotor in spaced, opposed relation to said coils.

7. A machine as claimed in claim 1, wherein said permanent magnet is mounted on said stationery member in a radial plane extending between said first and second coils.

8. A machine as claimed in claim 1, wherein said axially projecting portions of said first and second sets each include a radially projected arcuate base portion at an end thereof remote from said rotor and said permanent magnet includes a plurality of arcuate segments forming a discontinuous annulus, each of said arcuate segments being supported between respective pairs of opposed arcuate base portions of the axially projecting portions of said first and second sets.

9. A machine as claimed in claim 1, wherein said active portion includes a magnetic disk at said at least one end thereof.

10. A machine as claimed in claim 9, wherein said active portion includes a non-magnetic barrier disposed at said at least one end for supporting said magnetic disk on said rotor.

11. A machine as claimed in claim 1, wherein said active portion includes a magnetic disk at both ends.

* * * * *